United States Patent

[11] 3,625,560

[72] Inventor Robert M. Bjork
 10901 Topeka Drive, Northridge, Calif. 91324
[21] Appl. No. 885,068
[22] Filed Dec. 15, 1969
[45] Patented Dec. 7, 1971

[54] BOOT FOR CAMPER-TRUCK COMBINATION
 5 Claims, 4 Drawing Figs.
[52] U.S. Cl. .................................................... 296/23 MC, 52/208
[51] Int. Cl. ...................................................... B60p 3/32
[50] Field of Search ........................................... 296/23, 23 MC; 52/208

[56] References Cited
 UNITED STATES PATENTS
 3,321,233  5/1967  Davis .......................... 296/23 MC
 3,321,234  5/1967  Harrell ........................ 296/23 MC

*Primary Examiner*—Philip Goodman
*Attorney*—Jessup & Beecher

ABSTRACT: The invention provides a removable flexible plastic tubular member, or boot, for intercoupling the rear window aperture of a truck cab with the front facing window aperture of a camper carried by the truck, so as to afford communication between the truck and the camper. The boot assembly of the invention has an advantage in that it is capable of being coupled securely to the rim of the truck window aperture in a watertight, airtight, and dusttight joint, and yet it can be easily removed. Moreover, the boot assembly of the invention may be installed quickly and easily without the need for tools of any type, and the installation does not require holes in the truck body, or any alteration whatsoever thereto.

PATENTED DEC 7 1971
3,625,560
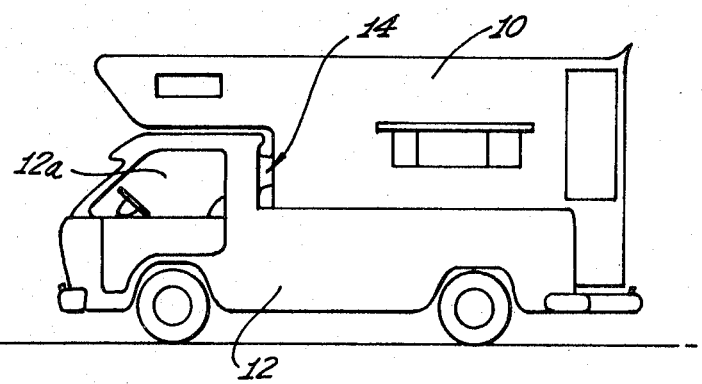
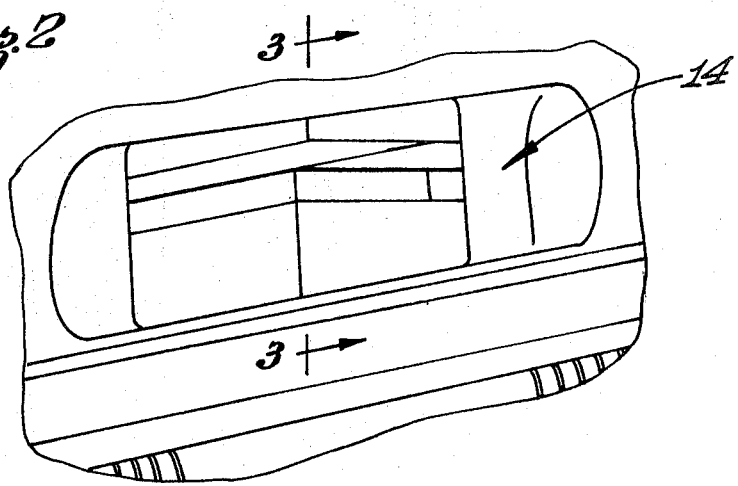
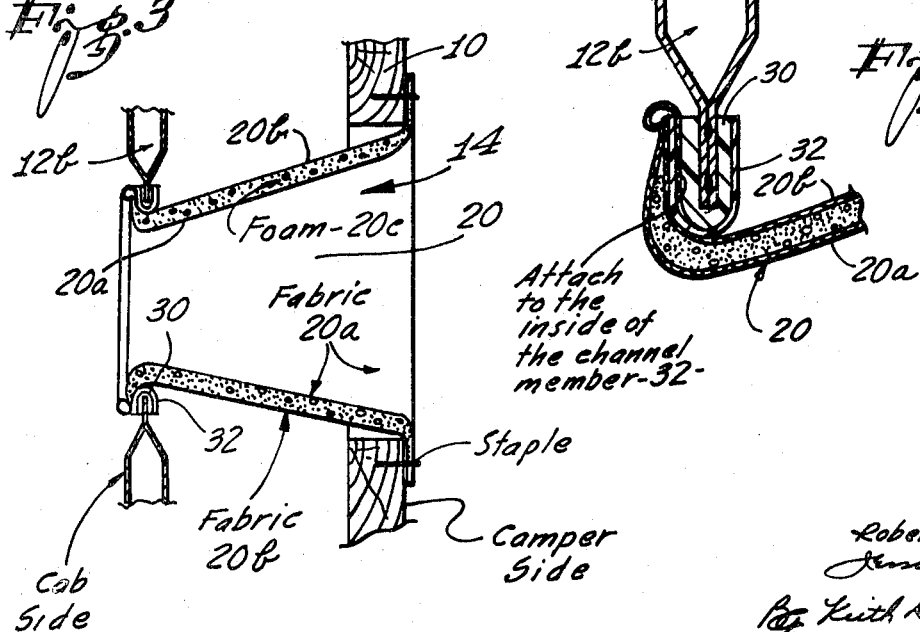
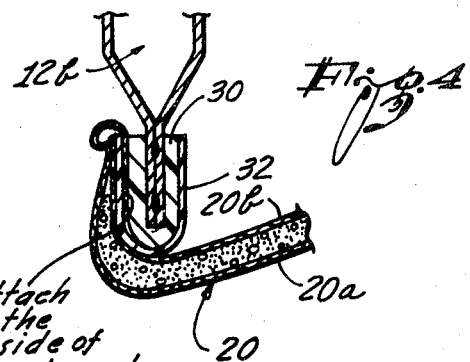
INVENTOR:
Robert M. Bjork
By Keith D. Beeler
ATTORNEYS

BOOT FOR CAMPER-TRUCK COMBINATION

BACKGROUND OF THE INVENTION

It is most desirable to provide a connecting passage between the cab and the camper in the usual truck/camper combinations. This is usually achieved by removing the rear window from the cab of the truck, and by also removing the facing front window from the forward wall of the camper. The two window apertures are then coupled together by means of an open-ended flexible boot, which extends between the truck and the camper and into the window apertures so as to define a communication passage between the cab and the camper.

However, the prior art boot assemblies such as described in the preceding paragraph are for the most part relatively expensive and difficult to install, and they have a tendency to leak and admit dust. The present invention provides a boot assembly which, as mentioned above, is absolutely watertight and dusttight, and which may be easily and rapidly snapped into place around the rim of a truck window aperture, so as to be installed without the need for tooling of any kind and without the requirement of any disfigurement whatever insofar as the truck body is concerned. In addition, the boot assembly of the invention may be equally easily removed from the truck window whenever the camper is to be taken off the truck.

BRIEF DESCRIPTION OF THE DRAWINGS

FIG. 1 is a side elevation of a truck and camper combination and showing a boot assembly extending between the forward end of the camper and the rear wall of the truck cab, the boot assembly being constructed, for example, in accordance with the concepts of the present invention;

FIG. 2 is an internal view of the boot assembly of FIG. 1 looking into the camper from the rear of the truck cab;

FIG. 3 is a cross-sectional view of the boot assembly taken essentially along the line 3—3 of FIG. 2; and FIG. 4 is a partial cross-sectional representation showing the manner in which a tubular component of the boot is adhesively attached to a U-shaped channel component thereof.

DETAILED DESCRIPTION OF THE ILLUSTRATED EMBODIMENT

The truck/camper assembly shown in FIG. 1 includes a usual type of camper 10 which is mounted on the back of a truck 12. The truck 12 has a cab 12a. In the practice of the present invention, the window is removed from the rear wall of the cab 12a, and the facing window is removed from the forward wall of the camper 10. Then, in order to provide a communicating channel between the cab 12a and the interior of the camper 10, a boot assembly 14 extends between the rear wall of the cab and the forward wall of the camper, the boot assembly being in the form of an enclosed passageway which extends into the window aperture in the rear of the truck and into the window aperture on the forward wall of the camper.

The boot assembly 14 may be secured to the inner rim around the window aperture of the camper by any appropriate means, such as stapling, or the like, so as to constitute a permanent fixture insofar as the camper 10 is concerned. However, in the practice of the present invention, the forward end of the boot assembly 14 is removably attached to the rim of the window aperture in the rear wall of the cab 12b. In this way, the boot assembly may be removed easily and simply from the rear window of the cab 12a, without the need of any tools, whenever the camper 10 is to be removed from the truck. Also, and as will be described, the boot assembly 14 is attached around the rim of the window in the rear wall of the cab without the need of any tools, or for any holes in the truck body, and merely by snapping it around the rim of the cab window.

As shown in FIGS. 2 and 3, for example, the boot assembly 14 includes an open-ended tubular member 20. The member 20, for example, may be formed of two layers of appropriate fabric, formed, for example, of vinyl plastic, or the like and sewn together. The two layers of fabric (designated 20a and 20b) may have a layer 26 of foam plastic therebetween. The tubular member 20 extends into the window aperture in the forward wall 10a of the camper 10, and it may be stapled around the margin of the window aperture of the trailer, or otherwise affixed, so as to constitute, for example, a permanent fixture insofar as the camper is concerned.

The forward end of the tubular member 20 extends into the window aperture in the rear wall 12b of the truck cab 12a. However, in a manner to be described, it is easily removed from the rim of the truck window aperture, so that the boot assembly 14 may be removed from the camper, whenever the camper is taken off the back of the truck.

In order to achieve the foregoing coupling between the forward end of the tubular member 20 and the rim of the truck window aperture, a resilient U-shaped pliable channel-shaped edging member 30 is first fitted around the rim of the window aperture in the wall 12b. The U-shaped edging member 30 is available commercially, and is usually designated as a "snap-on windless" strip.

The forward end of the tubular member 20, as best shown in FIG. 4, is attached to an elongated channel member 32, which extends around the peripheral edge of the forward end of the member 20. The elongated channel member 32 has a U-shaped cross section, and it may be formed of a thin piece of rigid plastic material, such as polyvinyl chloride, but with sufficiently thin walls to make the U-shaped member 32 sufficiently flexible so that it may be snapped into place around the windless strip 30. The tubular member 20 is attached to the peripheral edge of the forward end of the tubular member by an adhesive, by sewing, by stapling, or by any other appropriate means.

The forward end of the tubular member 20 may then be brought into the window aperture in the rear wall of the truck cab, and snapped into place, merely by snapping the U-shaped member 32 down over the snap-on windless strip 30. This results in a windproof, dustproof and waterproof joint between the boot and the rim of the cab window, and yet it permits the boot assembly 14 easily and conveniently to be removed from the cab window, whenever the camper is to be taken off the truck.

By bringing the peripheral edge of the forward end of the tubular member 20 around and attaching it to the inner side of the tubular member 32, as illustrated in FIG. 4, the assembly is firmly held in place when mounted around the truck window aperture, without excessive stress being placed on the joint between the two members.

The invention provides, therefore, an improved boot assembly for use in conjunction with a truck and camper combination, and one which may be releasably attached to the rear wall of the truck cab, and around the window aperture in the cab, without the need for tools, or for holes in the truck body. Also, the boot assembly may be easily removed from the truck, whenever desired. However, when the assembly is in place around the window aperture in the rear wall of the truck, it is sealed to the truck with a dusttight, watertight and airtight seal.

What is claimed is:

1. A boot assembly intercoupling the forward end of a camper to the rear end of a truck cab, and extending into a window aperture in the rear wall of said cab and into a window aperture in the forward wall of said camper, said boot assembly comprising: a flexible tubular member having a first open end and a second open end; a thin-walled U-shaped channel member affixed to said first open end of said flexible tubular member and extending around the external periphery thereof and facing outwardly and snapped over the rim of said window aperture in said rear wall of said cab, and a pliable resilient edging member extending around the rim of the window aperture in the rear wall of said cab to be received in the aforesaid thin-walled U-shaped member, said edging member serving as a seal between said U-shaped member and as a means for firmly retaining said U-shaped member on said rim.

2. The boot assembly defined in claim 1, in which said flexible tubular member and the aforesaid window apertures in said cab and in said camper have a generally rectangular cross-sectional configuration.

3. The boot assembly defined in claim 1, in which said flexible tubular member is formed of two layers of plastic fabric material sewn together, and which includes a foam plastic layer interposed between said layers of fabric material.

4. The boot assembly defined in claim 2, in which said two layers of plastic fabric material are sewn together, and which includes a foam plastic layer interposed between said layers of fabric material.

5. The boot assembly defined in claim 1, in which said U-shaped channel member is composed of a plastic material.

* * * * *